April 3, 1928.
R. M. COOLEY
1,664,592
VEHICLE SUPPORTING DEVICE FOR SOFT ROADS
Filed May 16, 1927
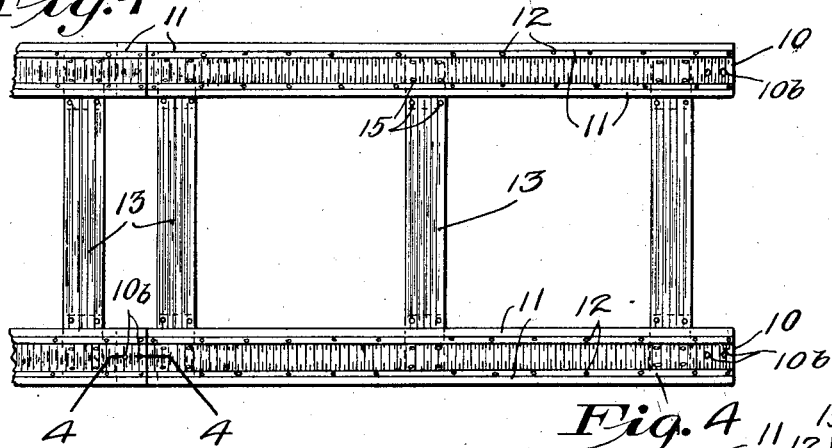
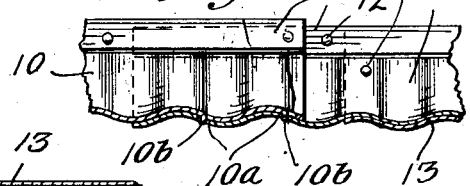
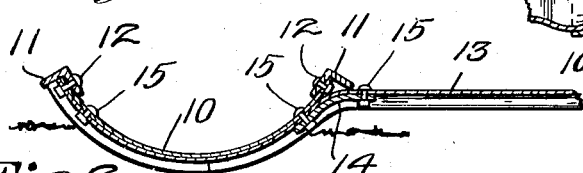
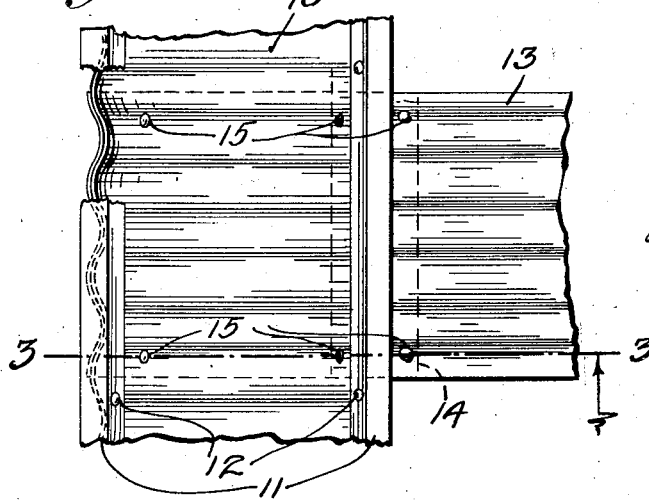
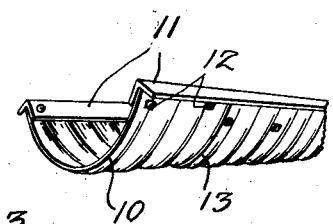
Inventor
Ralph M. Cooley
By his Attorneys
Williamson, Reiy & Williamson Patented Apr. 3, 1928.

1,664,592

UNITED STATES PATENT OFFICE.

RALPH M. COOLEY, OF ST. PAUL, MINNESOTA.

VEHICLE SUPPORTING DEVICE FOR SOFT ROADS.

Application filed May 16, 1927. Serial No. 191,645.

This invention relates to a vehicle supporting device, and particularly to such a device adapted to be used on soft roads. As is well known, certain roads become muddy and soft, especially in the winter and spring, and it is practically impossible for such roads to be traversed by heavy vehicles now in use. In the springtime particularly, a large portion of the highways in many States are practically impassable, owing to mud holes and soft places therein. At the same time, a great part of the highway is usable and the highway is thus often closed on account of a comparatively short stretch of bad road.

It is an object of this invention, therefore, to provide a device of simple and efficient construction which may be used to support vehicles on the soft road and thus render the road usable.

It is another object of the invention to provide such a device comprising spaced members extending longitudinally of the road, on which the wheels of a vehicle may be run, together with spaced connecting means for holding said members in proper position.

It is still another object of the invention to provide a light device, preferably of metal, comprising parallel trough-shaped members adapted to extend longitudinally of the road, which members are connected by spaced strips of considerable width.

It is a further object of the invention to provide a pair of parallel trough-shaped or semi-cylindrical members of corrugated metal, the same being connected by transversely extending corrugated strips of considerable width, said trough-shaped members having rigid reinforcing means at their edges and preferably being provided with means for connecting adjacent sections of the device.

These and other objects and advantages of the invention will be fully set forth in the following description taken in connection with the accompanying drawings, in which like reference characters refer to similar parts throughout the several views and in which:—

Fig. 1 is a plan view of the device, showing one complete section and a portion of another section connected thereto;

Fig. 2 is a partial plan view of the device shown on an enlarged scale and certain parts being broken away;

Fig. 3 is a vertical section taken on line 3—3 of Fig. 2 as indicated by the arrows;

Fig. 4 is a vertical section taken on line 4—4 of Fig. 1, as indicated by the arrows;

Fig. 5 is a perspective view of a portion of the device; and

Fig. 6 is a perspective view of the complete device.

Referring to the drawings, a device is shown comprising a pair of trough-shaped members 10. While these members may be of various shapes, in the embodiment of the invention illustrated they are shown as semi-cylindrical in form and comprising approximately 120° of a cylinder. While the members 10 may be made of various materials, in practice it has been found very efficient and suitable to make them of corrugated sheet metal. These members can thus conveniently be made from corrugated cylindrical pipes of large size, which are now commonly used for sewers and similar purposes. The members 10 have rigid reinforcing members 11 secured to the edges thereof. While these members 11 may be of various forms, in the embodiment of the invention illustrated they are shown as in the form of angle bars, one inside surface of the angle being in contact with the inner surface of the members 10 and the other inner surface of the angle extending outwardly across the edge of said members 10. The members 10 and 11 are connected by the bolts or rivets 12 or by welding. The members 10 are connected by spaced transverse members 13 and while these members may be variously formed, in the embodiment of the invention illustrated they are shown as also made of corrugated sheet metal, the same being shown as of considerable width. The ends of members 13 extend beneath the members 10 and around the same, having their outer ends terminating beneath the outer members 11. The members 13 have their top surfaces extending between the members 10 and slightly below the lower edge of the members 11. The members 13 also have reinforcing members 14 disposed therebeneath, adjacent the inner sides of the members 10, the members 13 being curved where they pass under the inner members 11. The members 14 are secured to the members 10 and 13 by the bolts or rivets 15 or by welding. The members 10 and 13 comprise a section with the connected parts as shown in Fig. 6. It is desirable to have these sections separate and so constructed that they can be detachably connected. While various means may be used for this purpose, one simple means is as shown in Fig. 4. At one end the sections 10 are provided with a plurality of openings $10^a$ in their bottoms or sides and at the other end with a plurality of struck-up tongues $10^b$. When the sections are overlapped end to end, the projections $10^b$ will enter the openings $10^a$.

In operation, one or more of the sections comprising the members 10 are laid down on the soft road. The members have a wide area and are supported in the mud or material of the road. If the soft spot is sufficiently long, more than one section will be used, the same being lapped and held together, as shown in Fig. 4, at which times the corrugations in the adjacent sections are nested. The vehicle can thus run over the device, the wheels running in the members 10. The troughs or members 10 will be spaced the distance of the standard gauge of automobile wheels. If a vehicle having a wider tread runs over the device, the wheels will usually center the members 10 and the connecting members 13 will be bowed to accommodate this relative movement of the members 10. With this device it is thus possible for the vehicles to pass over a very soft spot in the road. The device has been amply demonstrated in actual practice and found to be very successful and efficient.

From the above description it is seen that applicant has provided a very simple and efficient device for supporting vehicles on soft roads. The device is quite simple in construction and can be easily made and placed in position. The device is comparatively light, so that quite a number of sections can be transported to the place where they are to be used. The devices also nest together, so that quite a large number can be placed in a comparatively small space. A large number of the devices can thus be supported on an ordinary truck or wagon.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A device for supporting vehicles on soft roads comprising a pair of trough-shaped members of sheet material, rigid members secured to said trough-shaped members at each edge thereof and extending longitudinally thereof, and spaced transverse members connecting said trough-shaped members and holding the same in parallel relation.

2. A device for supporting vehicles on soft roads, comprising a pair of spaced trough-shaped members of substantially semi-cylindrical shape, rigid members secured to and extending along the edges of said members, spaced transverse members connecting said trough-shaped members and holding the same in parallel relation, said transverse members extending beneath said trough-shaped members and being secured at each side thereof.

3. A device for supporting vehicles on soft roads, having in combination, spaced trough-shaped members of substantially semi-cylindrical form having circumferential corrugations therein, spaced transverse members connecting said trough-shaped members and holding the same in parallel relation, said transverse members being longitudinally corrugated, the corrugations thereof nesting with the corrugations in said trough-shaped members, said transverse members extending around and beneath said trough-shaped members and means securing said trough-shaped members to said transverse members.

4. A device for supporting vehicles on soft roads, having in combination, spaced trough-shaped members of semi-cylindrical form, having circumferential corrugations therein, angle bars secured to and extending along the edges of said trough-shaped members and projecting outwardly therefrom, spaced transverse members connecting said trough-shaped members and holding the same in parallel realtion, said transverse members extending beneath said trough-shaped members and secured thereto.

5. A device for supporting vehicles on soft roads comprising a pair of trough-shaped members of substantially semi-cylindrical form, said members being formed from sheet metal and having rigid means at each edge extending longitudinally thereof, and spaced comparatively wide transverse members rigidly connected to said trough-shaped members extending therebetween and holding the same in spaced parallel relation, said transverse members being disposed substantially in a plane disposed between the bottom and top of said trough-shaped members, whereby said transverse members will engage the soft earth and assist in supporting said device therein.

6. A device for supporting vehicles on soft roads comprising a pair of long corrugated trough-shaped members of substantially semi-cylindrical form, and spaced wide transverse sheet metal members extending between and connected to said trough-shaped members for holding the same in spaced parallel relation, said transverse members and trough-shaped members being adapted to rest in soft earth to support vehicles therein.

7. A device for supporting vehicles on soft roads comprising a pair of long trough-shaped members of substantially semi-cylindrical form, and spaced wide corrugated transverse members connecting said trough-shaped members to hold the same in parallel spaced relation and to prevent displacement of the device.

8. A device for supporting vehicles on soft roads, comprising a pair of long trough-shaped members of substantially semi-cylindrical form, and wide spaced transverse members connecting said trough-shaped members to hold the same in spaced parallel relation, said transverse members having a plurality of corrugations extending longitudinally thereof to prevent the device from creeping as vehicles pass over the same.

9. A device for supporting vehicles on soft roads comprising a pair of long transversely corrugated trough-shaped members of substantially semi-cylindrical form, and wide spaced members extending between and securing said trough-shaped members together in parallel spaced relation, said last mentioned members having a series of corrugations formed longitudinally thereof, the corrugations in said first mentioned and last mentioned members being adapted to cooperate to prevent the device from creeping as vehicles pass over the same.

10. A device for supporting vehicles on soft roads and adapted to accommodate the wheels of vehicles set part by varying distances, comprising a pair of spaced substantially semi-cylindrical trough-like members and a plurality of resilient transverse members connecting the same in parallel spaced relation, whereby said transverse members may bow up at their centers to move said trough-like members closer together as vehicle wheels strike the outer inclined edges thereof.

In testimony whereof I affix my signature.

RALPH M. COOLEY.